US011632218B2

(12) United States Patent
Shin et al.

(10) Patent No.: US 11,632,218 B2
(45) Date of Patent: Apr. 18, 2023

(54) METHOD AND DEVICE FOR TRANSMITTING/RECEIVING SIGNAL IN WIRELESS COMMUNICATION SYSTEM

(71) Applicant: LG ELECTRONICS INC., Seoul (KR)

(72) Inventors: Seokmin Shin, Seoul (KR); Suckchel Yang, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/686,340

(22) Filed: Mar. 3, 2022

(65) Prior Publication Data
US 2022/0190993 A1 Jun. 16, 2022

Related U.S. Application Data

(63) Continuation of application No. PCT/KR2020/013450, filed on Oct. 5, 2020.
(Continued)

(30) Foreign Application Priority Data

Oct. 4, 2019 (KR) .................. 10-2019-0123416
Nov. 8, 2019 (KR) .................. 10-2019-0142429

(51) Int. Cl.
*H04L 5/00* (2006.01)
*H04W 72/12* (2009.01)

(52) U.S. Cl.
CPC .......... *H04L 5/0053* (2013.01); *H04L 5/0064* (2013.01)

(58) Field of Classification Search
CPC ................ H04L 5/0053; H04L 5/0064; H04L 5/0048; H04L 5/0058; H04L 5/0094; H04W 74/0808
See application file for complete search history.

(56) References Cited

U.S. PATENT DOCUMENTS

2017/0289993 A1* 10/2017 Yerramalli ............ H04L 5/0057
2017/0347353 A1* 11/2017 Yerramalli ........ H04W 72/0413
(Continued)

FOREIGN PATENT DOCUMENTS

CN  109891976  * 10/2017  ........ H04W 74/0808
JP  WO 2018021100  * 2/2018  ........... H04L 5/0048
(Continued)

OTHER PUBLICATIONS

Ericsson, "Feature lead summary for UL Signals and Channels," 3GPP TSG-RAN WG1 #98, R1-1909474, Sep. 2019, 26 pages.
(Continued)

*Primary Examiner* — Diane L Lo
*Assistant Examiner* — Abusayeed M Haque
(74) *Attorney, Agent, or Firm* — Lee, Hong, Degerman, Kang & Waimey PC

(57) ABSTRACT

A method and device for transmitting/receiving a signal in a wireless communication system, according to one embodiment of the present invention, transmits a PUCCH including UCI. With respect to a resource for transmitting the PUCCH, the PUCCH is determined to be associated with a first interlace, among the first interlace and a second interlace, on the basis that: (i) the first interlace, and the second interlace having a higher index than that of the first interlace are configured by means of information on the PUCCH resource; and (ii) the number of physical resource blocks (PRBs) for transmitting the UCI is equal to or less than the number of PRBs of the first interlace.

9 Claims, 10 Drawing Sheets

Related U.S. Application Data

(60) Provisional application No. 62/915,635, filed on Oct. 15, 2019.

(56) References Cited

U.S. PATENT DOCUMENTS

| | | | | |
|---|---|---|---|---|
| 2019/0229970 A1* | 7/2019 | Bhattad | ............. | H04W 74/0816 |
| 2019/0274187 A1 | 9/2019 | Urabayashi et al. | | |
| 2019/0289607 A1 | 9/2019 | Wei et al. | | |
| 2021/0160732 A1* | 5/2021 | Lee | ........................ | H04L 1/1671 |
| 2022/0116152 A1* | 4/2022 | Iyer | ......................... | H04L 1/188 |

FOREIGN PATENT DOCUMENTS

| | | | | | |
|---|---|---|---|---|---|
| JP | WO-2018021100 | * | 2/2018 | ........... | H04L 5/0048 |
| WO | 2017205133 | | 11/2017 | | |
| WO | WO 2018075745 | * | 4/2018 | ........... | H04W 74/08 |
| WO | WO-2018075745 | * | 4/2018 | ........... | H04W 74/08 |
| WO | 2018093939 | | 5/2018 | | |
| WO | WO 2018231728 | * | 12/2018 | ........... | H04W 72/12 |
| WO | WO-2018231728 | * | 12/2018 | ........... | H04W 72/12 |

OTHER PUBLICATIONS

LG Electronics, "Physical layer design of UL signals and channels for NR-U," 3GPP TSG-RAN WG1 #98, R1-1908534, Aug. 2019, 26 pages.

Nokia, Nokia Shanghai Bell, "NR-U enhancements for uplink signals and channels," 3GPP TSG-RAN WG1 #98, R1-1908684, Aug. 2019, 16 pages.

PCT International Application No. PCT/KR2020/013450, International Search Report dated Jan. 26, 2021, 9 pages.

European Patent Office Application Serial No. 20870822.2, Search Report dated Nov. 14, 2022, 10 pages.

Korean Intellectual Property Office Application No. 10-2022-7007251, Prior Art Search Report dated Oct. 18, 2022, 5 pages.

LG Electronics, "Text proposals on long PUCCH structure", R1-1800376, 3GPP TSG RAN WG1 Meeting AH 1801, Jan. 2018, 10 pages.

MCC Support, "Final Report of 3GPP TSG RAN WG1 #94bis v1.0.0 (Chengdu, China, Oct. 8-12, 2018)", R1-1812101, 3GPP TSG RAN WG1 Meeting #95, 197 pagea.

* cited by examiner

[FIG. 1]
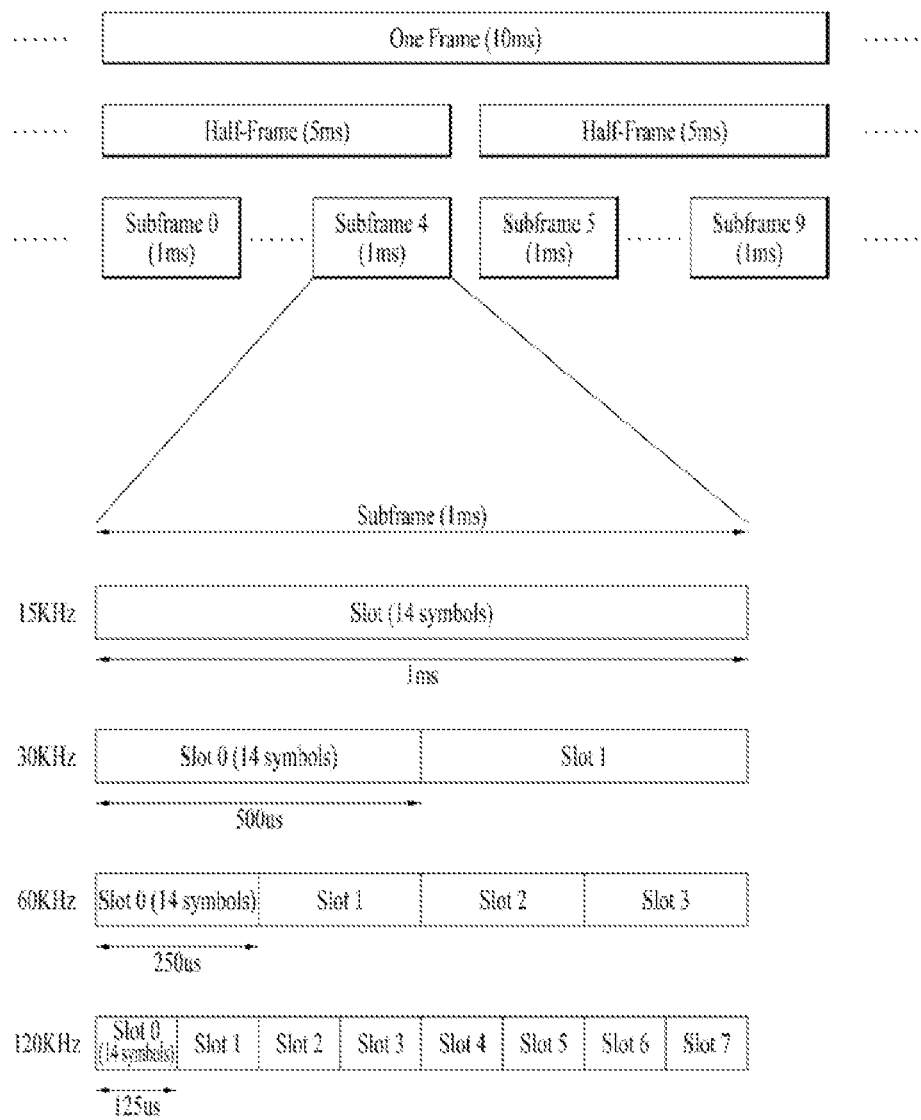

[FIG. 2]
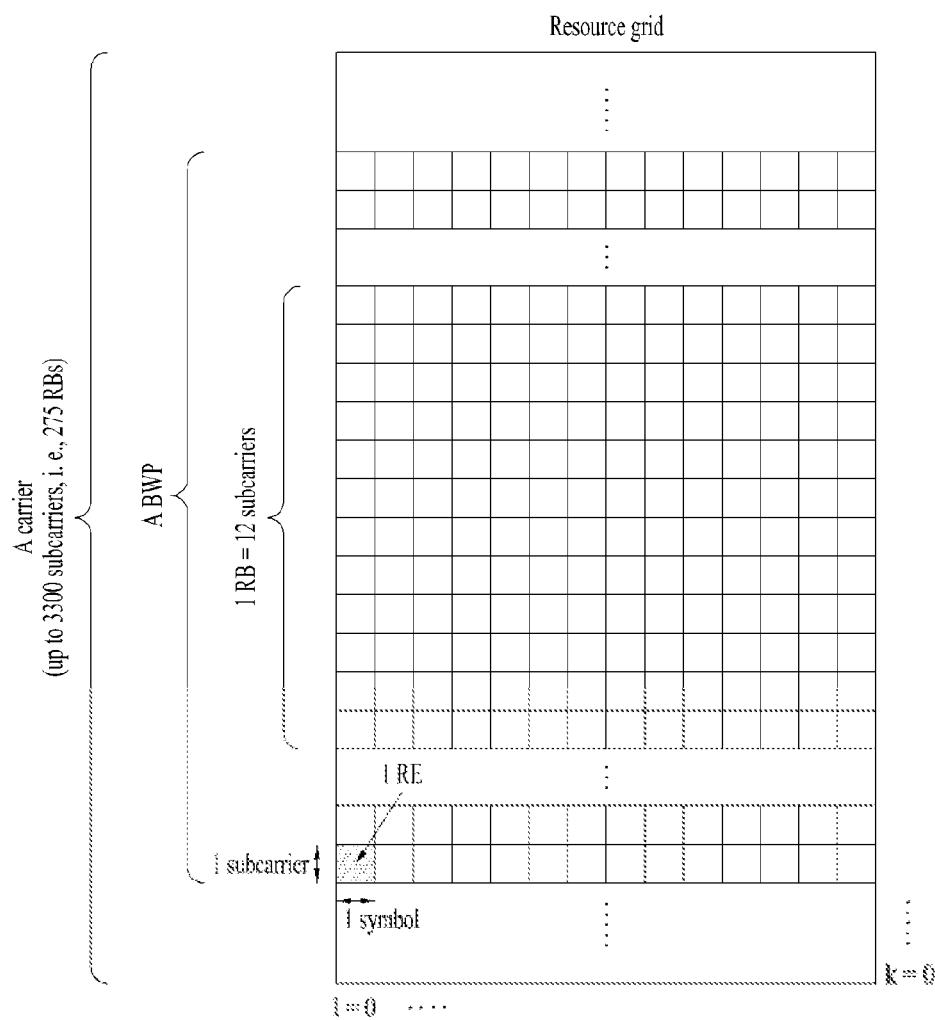

[FIG. 3]
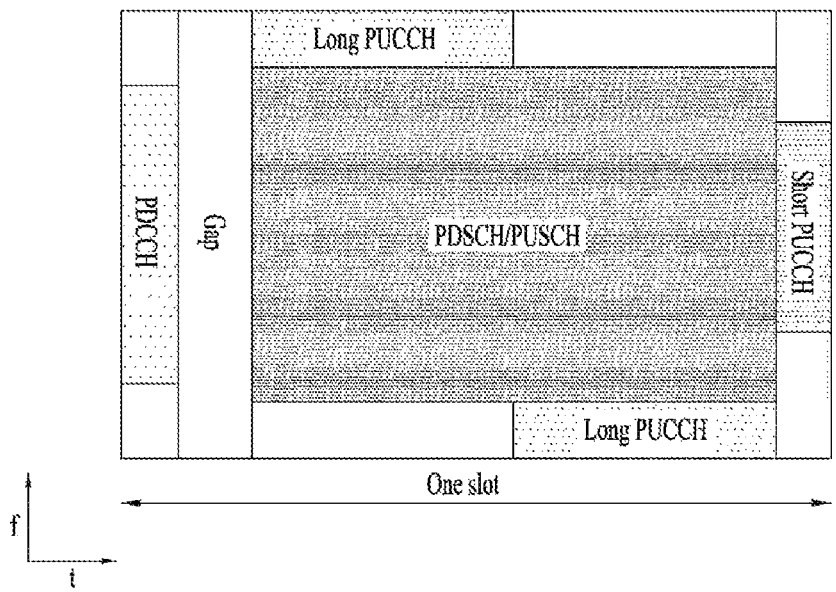
[FIG. 4]
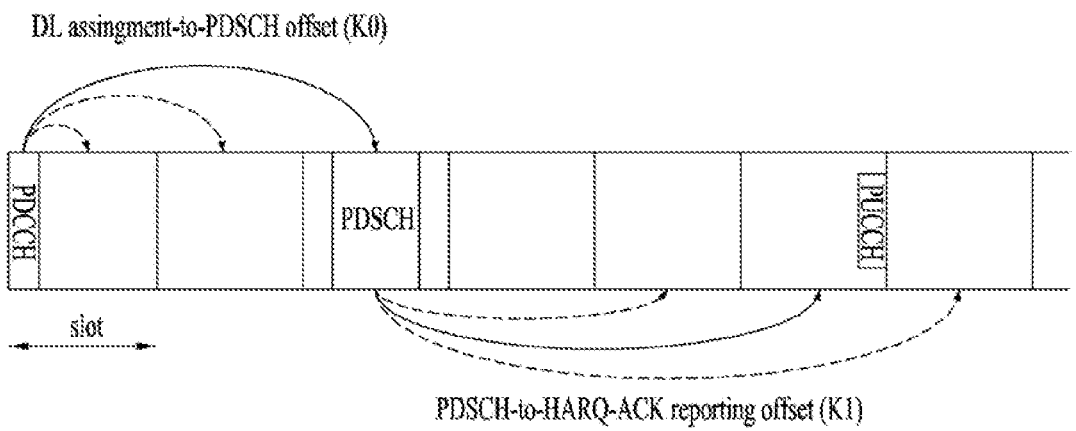

[FIG. 5]
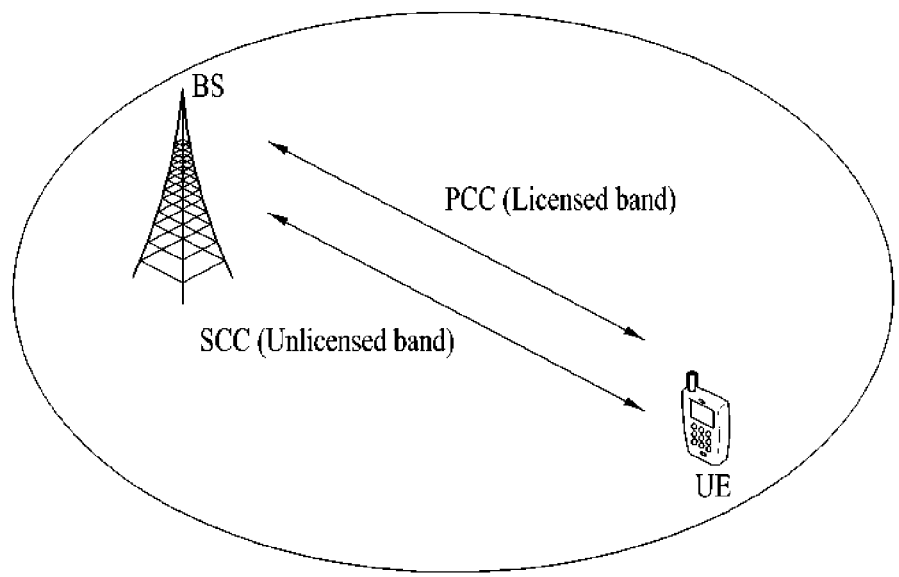
(a) Carrier aggregation between L-band and U-band
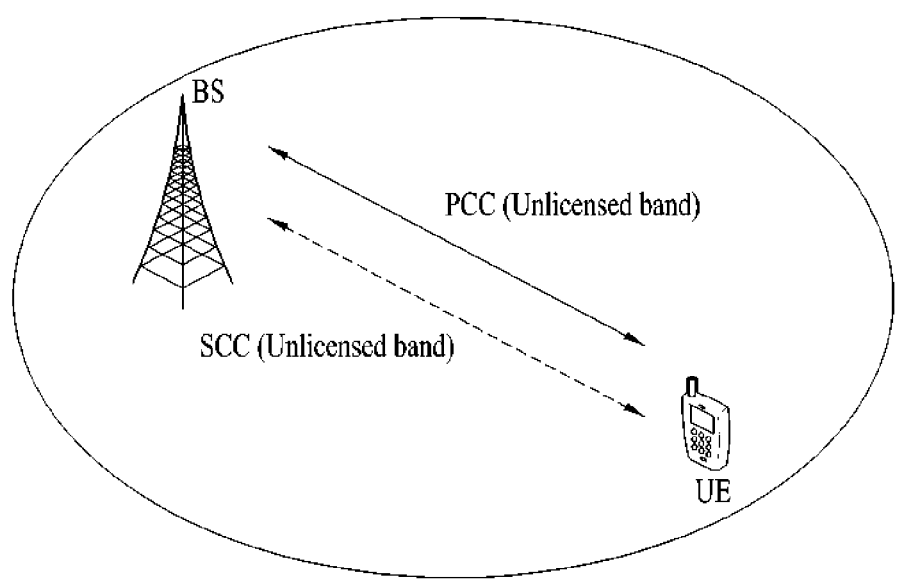
(b) Standalone U-band(s)

【FIG. 6】
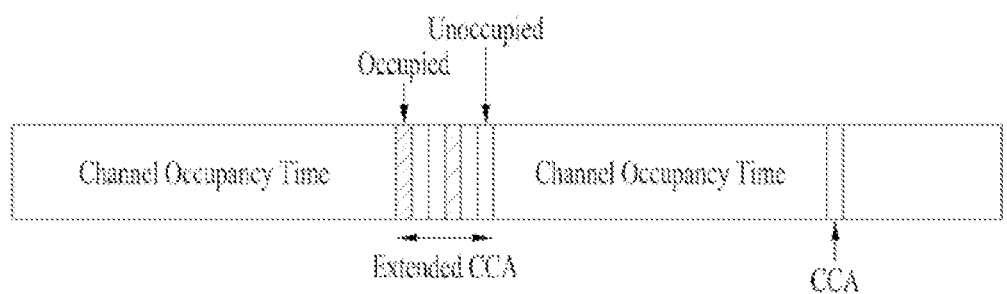
【FIG. 7】
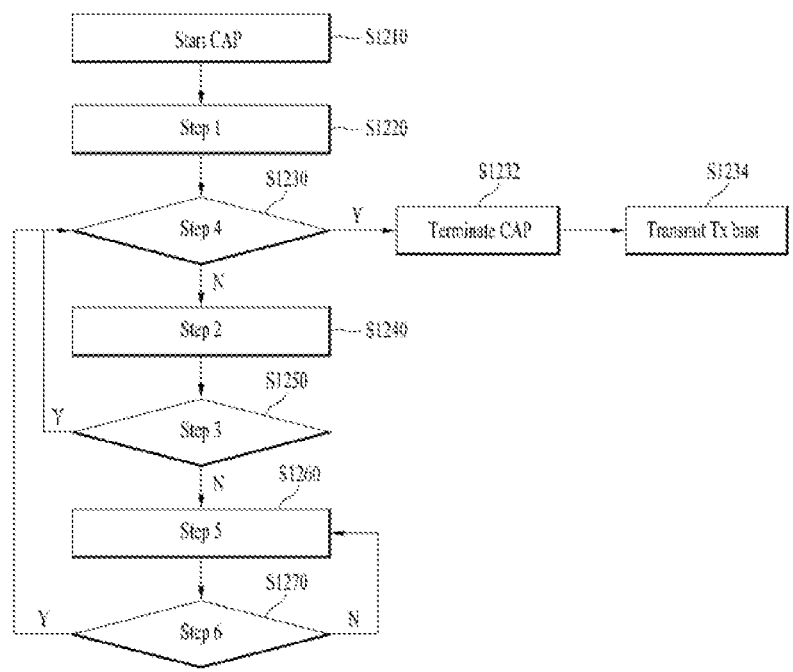

[FIG. 8]
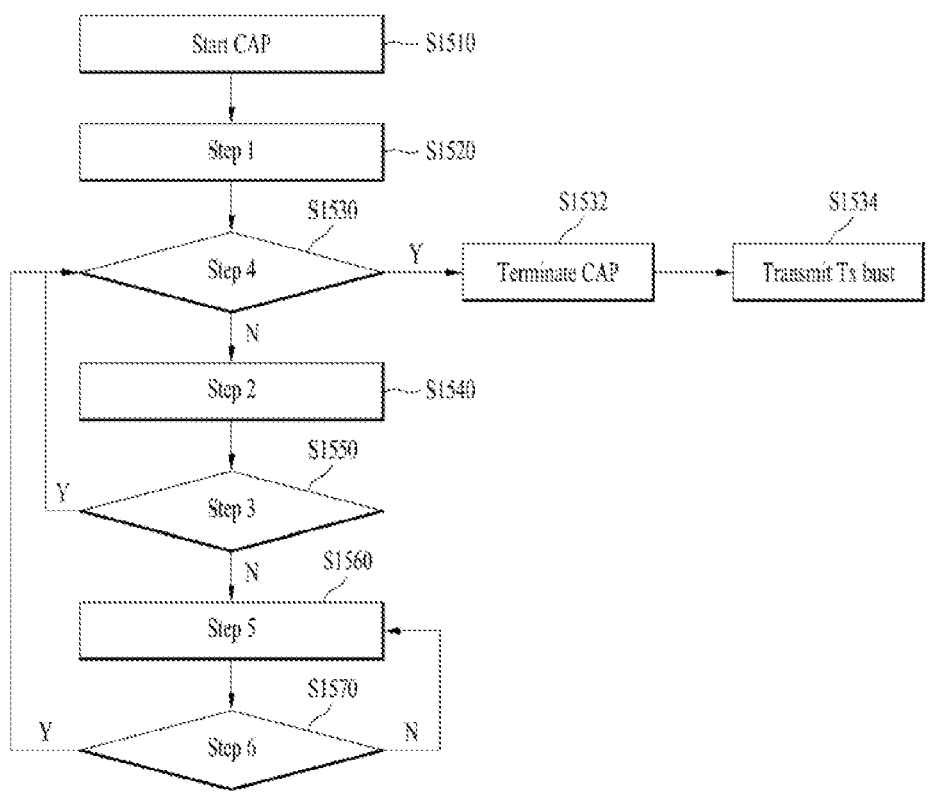

[FIG. 9]
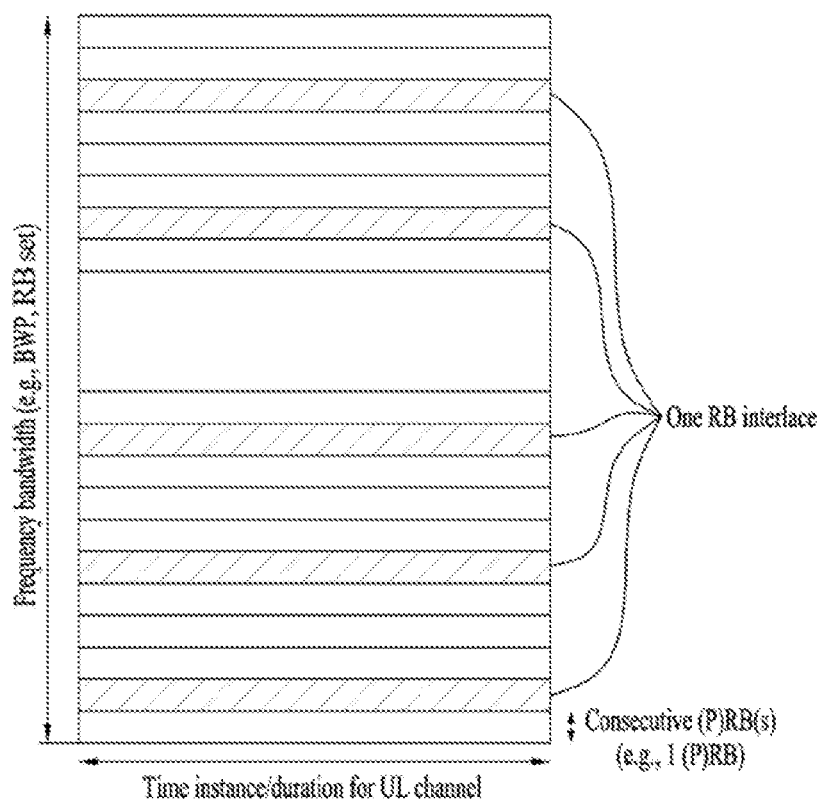

[FIG. 10]
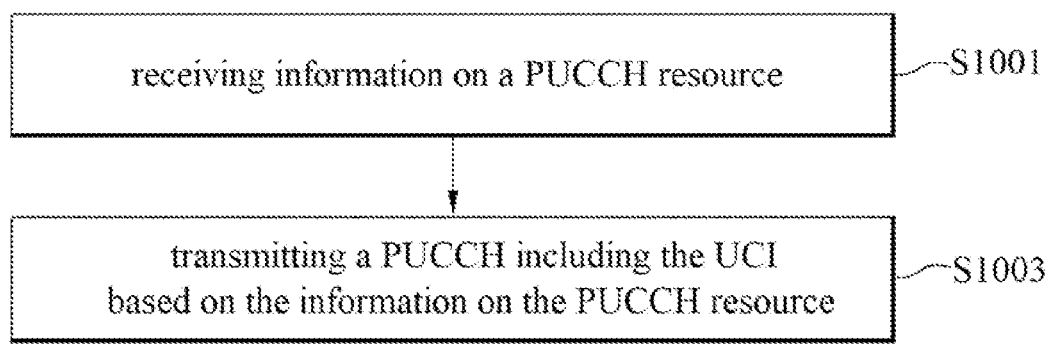

【FIG. 11】
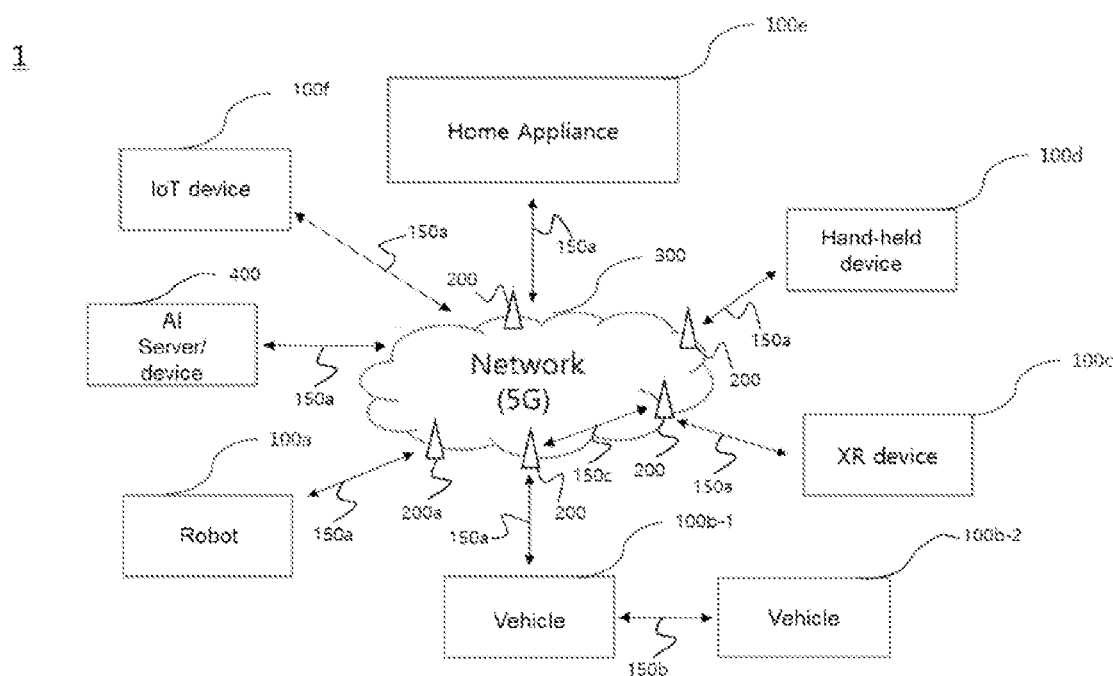
【FIG. 12】
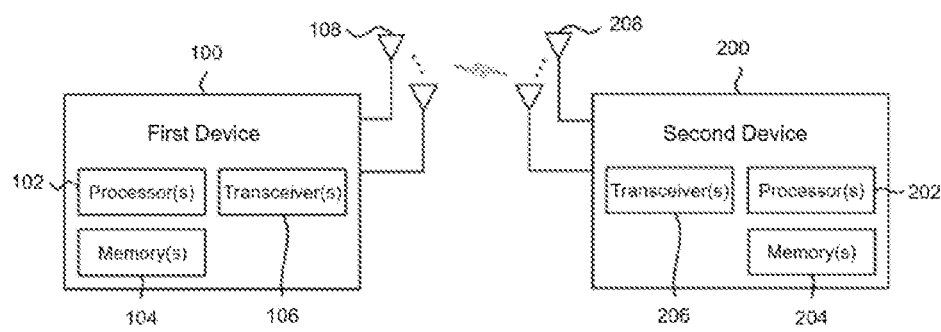

[FIG. 13]
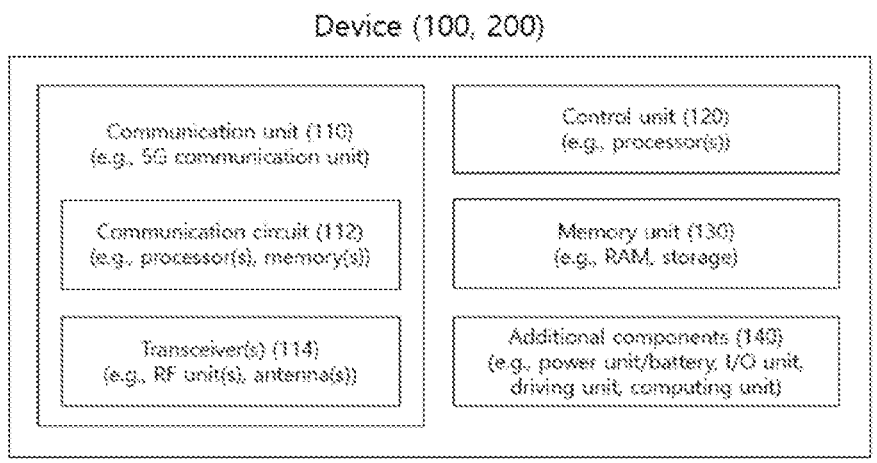
[FIG. 14]
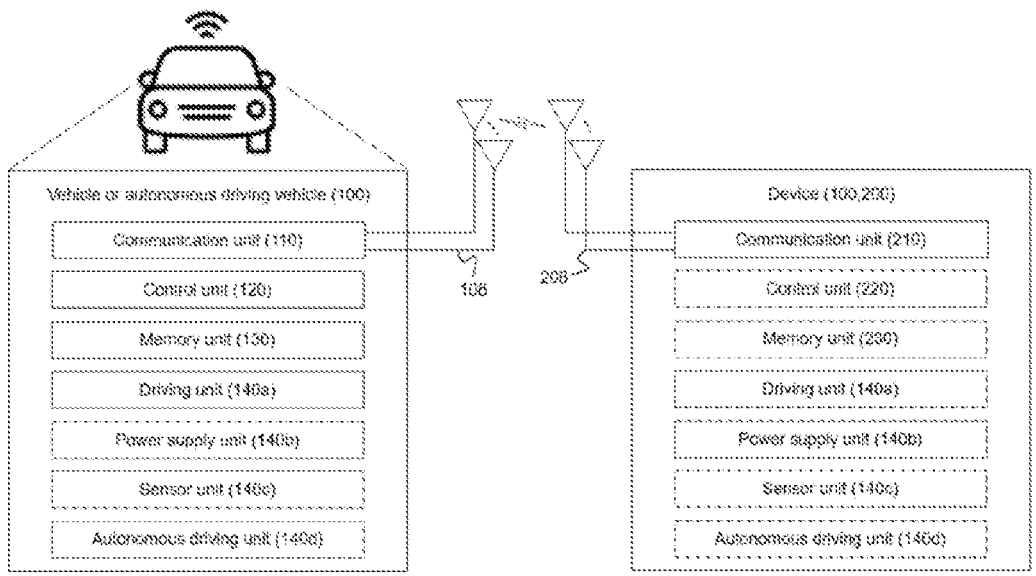

METHOD AND DEVICE FOR TRANSMITTING/RECEIVING SIGNAL IN WIRELESS COMMUNICATION SYSTEM

CROSS-REFERENCE TO RELATED APPLICATIONS

This application is a continuation of International Application No. PCT/KR2020/013450, filed on Oct. 5, 2020, which claims the benefit of earlier filing date and right of priority to Korean Patent Application Nos. 10-2019-0123416 filed on Oct. 4, 2019, and 10-2019-0142429 filed on Nov. 8, 2019, and also claims the benefit of U.S. Provisional Application No. 62/915,635 filed on Oct. 15, 2019, the contents of all of which are hereby incorporated by reference herein in their entirety.

TECHNICAL FIELD

The present disclosure relates to a method and apparatus for use in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In one aspect of the present disclosure, a method of transmitting and receiving a signal by a user equipment (UE) operating in a wireless communication system is provided. The method may include: receiving information on a physical uplink control channel (PUCCH) resource; and transmitting a PUCCH including uplink control information (UCI) based on the information on the PUCCH resource. Based on (i) a first interlace and a second interlace configured by the information on the PUCCH resource and (ii) a number of physical resource blocks (PRBs) for transmitting the UCI less than or equal to a number of PRBs of the first interlace, the PUCCH may be transmitted in the first interlace among the first and second interlaces. In this case, an index of the second interlace may be higher than an index of the first interlace.

In another aspect of the present disclosure, a communication apparatus (UE) configured to transmit and receive a signal in a wireless communication system is provided. The communication apparatus may include: at least one transceiver; at least one processor; and at least one memory operably connected to the at least one processor and configured to store instructions that, when executed, cause the at least one processor to perform operations including: receiving information on a PUCCH resource; and transmitting a PUCCH including UCI based on the information on the PUCCH resource. Based on (i) a first interlace and a second interlace configured by the information on the PUCCH resource and (ii) a number of PRBs for transmitting the UCI less than or equal to a number of PRBs of the first interlace, the PUCCH may be transmitted in the first interlace among the first and second interlaces. In this case, an index of the second interlace may be higher than an index of the first interlace.

In another aspect of the present disclosure, an apparatus for a UE is provided. The apparatus may include: at least one processor; and at least one computer memory operably connected to the at least one processor and configured to, when executed, cause the at least one processor to perform operations including: receiving information on a PUCCH resource; and transmitting a PUCCH including UCI based on the information on the PUCCH resource. Based on (i) a first interlace and a second interlace configured by the information on the PUCCH resource and (ii) a number of PRBs for transmitting the UCI less than or equal to a number of PRBs of the first interlace, the PUCCH may be transmitted in the first interlace among the first and second interlaces. In this case, an index of the second interlace may be higher than an index of the first interlace.

In a further aspect of the present disclosure, a computer-readable storage medium having at least one computer program configured to, when executed, cause at least one processor to perform operations is provided. The operations may include: receiving information on a PUCCH resource; and transmitting a PUCCH including UCI based on the information on the PUCCH resource. Based on (i) a first interlace and a second interlace configured by the information on the PUCCH resource and (ii) a number of PRBs for transmitting the UCI less than or equal to a number of PRBs of the first interlace, the PUCCH may be transmitted in the first interlace among the first and second interlaces. In this case, an index of the second interlace may be higher than an index of the first interlace.

In the method and apparatuses, whether the number of the PRBs for transmitting the UCI is less than or equal to the number of the PRBs of the first interlace may be determined based on a size of the UCI and a coding rate.

In the method and apparatuses, the index of the first interlace and the index of the second interlace may be determined based on radio resource control (RRC) signaling including the information on the PUCCH resource.

In the method and apparatuses, the first and second interlaces may include a same number of PRBs.

In the method and apparatuses, the PUCCH may be transmitted based on a specific PUCCH format, and the specific PUCCH format may include PUCCH format 2 and PUCCH format 3.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure.

FIG. 2 illustrates a resource grid during the duration of a slot.

FIG. 3 illustrates a self-contained slot structure.

FIG. 4 illustrates an acknowledgment/negative acknowledgment (ACK/NACK) transmission process.

FIG. 5 illustrates a wireless communication system supporting an unlicensed band.

FIG. 6 illustrates an exemplary method of occupying resources in an unlicensed band.

FIGS. 7 and 8 are flowcharts illustrating channel access procedures (CAPs) for signal transmission in an unlicensed band.

FIG. 9 illustrates a resource block (RB) interlace.

FIG. 10 is a diagram illustrating uplink (UL) channel transmission according to the embodiments of the present disclosure.

FIGS. 11 to 14 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 4 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: number of symbols in a slot
$N^{frame,u}_{slot}$: number of slots is a frame
$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

NR may support various numerologies (or subcarrier spacings (SCSs)) to provide various 5G services. For example, NR may support a wide area in conventional cellular bands for an SCS of 15 kHz and support a dense urban area and a wide carrier bandwidth with lower latency for an SCS of 30 or 60 kHz. For an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table A6 below. FR 2 may mean a millimeter wave (mmW).

TABLE 3

| Frequency Range designation | Corresponding frequency range | Subcarrier Spacing |
| --- | --- | --- |
| FR1 | 450 MHz-7125 MHz | 15, 30, 60 kHz |
| FR2 | 24250 MHz-52600 MHz | 60, 120, 240 kHz |

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

TABLE 5

| RNTI | Usage | Transport Channel |
| --- | --- | --- |
| P-RNTI | Paging and System Information change notification | PCH (Paging Channel) |
| SI-RNTI | Broadcast of System Information | DL_SCH |
| RA-RNTI | Random Access Response | DL_SCH |
| Temporary C-RNTI | Contention Resolution (when no valid C-RNTI is available) | DL_SCH |
| Temporary C-RNTI | Msg3 transmission | UL_SCH |
| C-RNTI, MCS (Modulation and Coding Scheme)-C-RNTI | Dynamically scheduled unicast transmission | UL_SCH |
| C-RNTI | Dynamically scheduled unicast transmission | DL_SCH |
| MCS-C-RNTI | Dynamically scheduled unicast transmission | DL_SCH |
| C-RNTI | Triggering of PDCCH ordered random access | N/A |
| CS (Configued Scheduling)-RNTI | Configured scheduled unicast transmission (activation, reactivation and retransmission) | DL_SCH, UL_SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

UL Physical Channels/Signals
(1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (HACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 7 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |

TABLE 7-continued

| PUCCH format | Length in OFDM symbols $N_{symb}^{PUCCH}$ | Number of bits | Usage | Etc |
|---|---|---|---|---|
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)

Supportable UCI payload size: up to K bits (e.g., K=2)

Number of OFDM symbols included in one PUCCH: 1 to X symbols (e.g., X=2)

Transmission structure: only a UCI signal is configured with no DM-RS, and a UCI state is transmitted by selecting and transmitting one of a plurality of sequences.

(1) PUCCH Format 1 (PF1)

Supportable UCI payload size: up to K bits (e.g., K=2)

Number of OFDM symbols included in one PUCCH: Y to Z symbols (e.g., Y=4 and Z=14)

Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)

Supportable UCI payload size: more than K bits (e.g., K=2)

Number of OFDM symbols included in one PUCCH: 1 to X symbols (e.g., X=2)

Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)

Supportable UCI payload size: more than K bits (e.g., K=2)

Number of OFDM symbols included in one PUCCH: Y to Z symbols (e.g., Y=4 and Z=14)

Transmission structure: UCI and a DMRS are configured/mapped in/to different symbols based on TDM. The DFT is applied to encoded UCI bits with no multiplexing between UEs.

FIG. 4 illustrates an ACK/NACK transmission process. Referring to FIG. 4, the UE may detect a PDCCH in slot #n.

The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

FIG. 5 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}$=9 us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

- Transmission(s) initiated by the BS including (i) a unicast PDSCH with user plane data or (ii) a unicast PDCCH scheduling user plane data in addition to the unicast PDSCH with user plane data, or
- Transmission(s) initiated by the BS including (i) a discovery burst only or (ii) a discovery burst multiplexed with non-unicast information.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration $T_d$ are detected to be idle.

Step 6) (S1270) If the channel is sensed to be idle for all the slot durations of the additional defer duration $T_d$ (Y), step 4 proceeds. Otherwise (N), step 5 proceeds.

Table 8 shows that $m_p$, a minimum contention window (CW), a maximum CW, a maximum channel occupancy time (MCOT), and an allowed CW size, which are applied to the CAP, vary depending on channel access priority classes.

TABLE 8

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p} \leq CW_p \leq CW_{max,p}$. $CW_p$ may be initially configured by $CW_p = CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

- Transmission(s) initiated by the BS including (i) a discovery burst only or (ii) a discovery burst multiplexed with non-unicast information, or
- Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16 us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

- PUSCH/SRS transmission(s) scheduled and/or configured by the BS
- PUCCH transmission(s) scheduled and/or configured by the BS
- Transmission(s) related to a Random Access Procedure (RAP)

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N−1 (N=N−1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 9 shows that $m_p$, a minimum CW, a maximum CW, an MCOT, and an allowed CW size, which are applied to the CAP, vary depending on channel access priority classes.

TABLE 9

| Channel Access Priority Class (p) | $m_p$ | $CW_{min,p}$ | $CW_{max,p}$ | $T_{mcotp}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The defer duration $T_d$ is configured in the following order: duration $T_f$(16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p} <= CW_p <= CW_{max,p}$. $CW_p$ may be initially configured by $CW_p = CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$(=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16 us. In the Type 2B UL CAP, $T_f$ includes a sensing slot within 9 us from the end of the duration. In the Type 2C UL CAP, the UE does not perform channel sensing before performing transmission.

RB Interlace

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M represents the number of interlaces. A transmitter (e.g., UE) may use one or more interlaces to transmit a signal/channel. The signal/channel may include a PUCCH or PUSCH.

2. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH sequence selection methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

As in Table 7 described above, the PUCCH formats in the legacy NR system include 5 PUCCH formats from PUCCH format 0 to PUCCH format 4. PUCCH formats 0, 1, and 4 are configured to occupy one PRB, and PUCCH formats 2 and 3 are configured to occupy 1 to 16 PRBs in OFDM symbols.

Hereinafter, a PUCCH format used for the shared spectrum is proposed. When a specific device (and/or node) transmits a signal in the shared spectrum, there may be restrictions in terms of power spectral density (PSD). For example, according to ETSI regulations, signal transmission in a specific band should satisfy a PSD of 10 dBm/1 MHz. If a PUCCH is transmitted in PUCCH format 0 (1 PRB, 180 kHz) when an SCS of 15 kHz is configured, a maximum allowable power for the PUCCH may be about 10 dBm. In general, the maximum power of a UE is 23 dBm, and 10 dBm corresponds to an allowable power significantly lower than 23 dBm. When the UE transmits a UL signal at 10 dBm, maximum UL coverage supportable by the UE may be reduced. If the UE increases transmission power by transmitting the PUCCH in a wider frequency domain (F-domain), this may be helpful to solve the problem in which UL coverage is reduced. As regulations on the shared spectrum, there may be restrictions in terms of occupied channel bandwidth (OCB). For example, when a specific device transmits a signal, the signal may have to occupy at least 80% of a system bandwidth. If the system bandwidth is 20 MHz, the signal transmitted by the specific device may have to occupy more than 16 MHz, which is 80% of 20 MHz.

As a PUCCH structure in consideration of the PSD and OCB regulations, the above-described RB interlace structure may be used. For example, a PUCCH may be configured by repeating the PUCCH sequence of a conventional PUCCH, which is configured to use one PRB as in PUCCH format 0 and/or 1, over PRBs spaced at specific intervals in the frequency domain in consideration of the OCB.

For PUCCH formats 2 and/or 3, 1 to 16 PRBs may be configured, and thus configured PRBs may be transmitted in the form of an interlace in consideration of the OCB. The present disclosure proposes methods of changing PUCCH formats 2 and 3 to be used in a shared spectrum. In this document, 'transmission of a PUCCH format' may mean 'transmission of a PUCCH configured in the corresponding PUCCH format'.

Hereinafter, UE operations for transmitting a PUCCH based on a UL interlace proposed in the present disclosure will be described.

(1) First, the UE may receive UL interlace configuration information for transmitting a PUCCH format from the BS. Here, the UL interlace configuration information may include the UL interlace indices of UL interlaces that satisfy OCB requirements defined for each SCS.

(2) Then, the UE may determine at least one UL interlace based on the UL interlace configuration information. (3) The UE may transmit the PUCCH format to the BS based on the determined at least one UL interlace.

Details will be further described with reference to the following methods. That is, the following methods to be described later may be combined with procedures (1) to (3) described above to achieve the objects/effects of the present disclosure. In this specification, the term 'unlicensed band' may be replaced and interchanged with the term 'shared spectrum'. In addition, the term 'LBT type' may be replaced and interchanged with the term 'channel access type'

3.1 Embodiment 1: PUCCH Format 2/3 Enhancement for NR-U Operation

In NR, a single UE may be allocated 1 to 16 PRBs for PUCCH formats 2 and 3. However, to maintain a UCI bit size and a coding rate similar to those of NR, a single interlace may not be enough. Accordingly, it is being discussed that two interlaces are allocated for PUCCH format 2 or 3.

In addition, UE multiplexing based on enhanced PUCCH formats is also considered in NR. Therefore, the following operation/configuration methods are proposed in relation to multi-interlace allocation and UE multiplexing.

Proposed Method 1-1-1: Whether UE multiplexing is supported may vary according to the total number of interlaces allocated for a PUCCH resource (e.g., for enhanced PUCCH format 2/3).

1-1-1-A. As an example, if one interlace is allocated as a PUCCH resource, UE multiplexing may be allowed. If two or more (or up to two) interlaces are allocated as a PUCCH resource, UE multiplexing may not be allowed, and the corresponding PUCCH resource may be all occupied by a single UE.

For example, if two interlaces (e.g., composed of 20, 21, or 22 PRBs) are allocated to a single UE for transmission of ePUCCH format 2/3, the total number of PRBs exceeds 16, and thus the UCI bit size and coding rate may be maintained to be similar to those of NR.

1-1-1-B. As another example, for PUCCH format 2/3 in which multiplexing of multiple UE is supported (by applying CDM, etc.), only a PUCCH resource consisting of a maximum of one interlace may be configured and/or allocated to a single UE. For PUCCH format 2/3 in which multiplexing of multiple UEs is not supported, a PUCCH resource consisting of two or more interlaces may be configured and/or allocated to a single UE.

1-1-1-C. To indicate Proposed Method 1-1, an explicit parameter (e.g., 1-bit on/off) indicating that UE multiplexing is allowed may be included in higher layer signaling (e.g., SIB, remaining minimum system information (RMSI), etc.).

1-1-1-D. Alternatively, to implicitly indicate that UE multiplexing is allowed, the number of UEs for multiplexing (# of UE for multiplexing), a spreading factor (e.g., OCC length), the number of interlaces for a PUCCH resource (# of interlace for PUCCH resource), etc. may be included in higher layer signaling (e.g., SIB, RMSI, etc.).

Proposed method 1-1-2: A PUCCH resource may be allocated by increasing # of PRBs (i.e., # of interlaces) as the number of multiplexed UEs increases.

1-1-2-A. As an example, to maintain the UCI bit size and coding rate similar to those of NR, it is necessary to secure up to 16 PRBs for the UE. To allow N UEs to use up to 16 PRBs, the number of interlaces (# of interlaces) needs to be capable of covering a total of N*16 PRBs.

Here is a description with specific numbers.

If the number of UEs N is 2, a maximum of 32 PRBs are required for PUCCH transmission (15/30 kHz SCS). Accordingly, the indices of three (or four) interlaces, each of which is composed of 10/11 PRBs, may be used. When three interlaces are used, two interlaces each composed of 11 PRBs and one interlace composed of 10 PRBs may be used. When four interlaces are used, the four interlaces may be used regardless of the number of PRBs.

If the number of UEs N is 3, a maximum of 48 PRBs are required for PUCCH transmission (15/30 kHz SCS). Therefore, the indices of five interlace, each of which is composed of 10/11 PRBs, may be used.

If the number of UEs N is 4, a maximum of 64 PRBs are required for PUCCH transmission (15/30 kHz SCS). Accordingly, the indices of 6 (or 7) interlaces, each of which is composed of 10/11 PRBs, may be used. When 6 interlaces are used, four interlaces each composed of 11 PRBs and two interlaces each composed of 10 PRBs may be used. When 7 interlaces are used, the 7 interlaces may be used regardless of the number of PRBs.

If the number of UEs N is5, a maximum of 80 PRBs are required for PUCCH transmission (15/30 kHz SCS). Therefore, the indices of 8 interlace, each of which is composed of 10/11 PRBs, may be used.

If the number of UEs N is 6, a maximum of 96 PRBs are required for PUCCH transmission (15/30 kHz SCS). Accordingly, the indices of 9 (or 10) interlaces, each of which is composed of 10/11 PRBs, may be used. When 9 interlaces are used, 6 interlaces each composed of 11 PRBs and three interlaces each composed of 10 PRBs may be used. When 10 interlaces are used, 10 interlaces may be used regardless of the number of PRBs.

When the number of UEs N is more than or equal to 7, the same UCI bit size and coding rate may not be maintained.

That is, when one UE needs to occupy a maximum of 16 PRBs, up to 3 UEs may be multiplexed for the 30 kHz SCS, and up to 6 UEs may be multiplexed for the 15 kHz SCS. As the number of PRBs to be occupied by one UE decreases, the maximum number of multiplexed UE may increase for each SCS.

1-1-2-B. As another example, for PUCCH format 2/3 in which multiplexing of up to N UEs is supported (by applying CDM, etc.), a PUCCH resource consisting of a maximum of K×N (e.g., K=2) interlaces may be configured and/or allocated to a single UE. For PUCCH format 2/3 in which no UE multiplexing is supported, a PUCCH resource consisting of a maximum of K (e.g., K=2) interlaces may be configured and/or allocated to a single UE.

Additionally, when the BS instructs the UE to configure and/or transmit a plurality of interlaces on a single ePUCCH format 2 resource, and when UE multiplexing (based on CDM) is allowed on the plurality of interlaces, it is necessary to indicate an OCC index and an OCC mapping method to be applied by each UE to UCI (REs) and DMRS (REs). To this end, the following configuration/operation methods are proposed. In the following description, OCCs used in the conventional system may be considered, or OCCs with new lengths and types may be proposed.

Proposed Method 1-2-1: A plurality of individual/independent OCC indices (or a common one OCC index) may be configured for a plurality of interlaces included in a single PUCCH resource, respectively, and an OCC index may be applied/mapped to each interlace index.

1-2-1-A. As an example, when interlace index N and interlace index N+1 are configured and/or allocated as a single PUCCH format (e.g., PUCCH format 2) resource for a single UE, OCC index i for interlace index N may be configured, and OCC index j for interlace index N+1 may be configured independently of OCC index i (implicitly/explicitly).

As a specific embodiment, when each independent OCC index is configured, each OCC may be mapped to each PRB included in each interlace. That is, OCC index i may be mapped to PRBs included in an interlace with index N, and OCC index j may be mapped to PRBs included in an interlace with index N+1.

As another embodiment, when OCC index cycling is applied to change the OCC index between PRBs included in one interlace (with a specific pattern), the configured OCC index may be se to an initial OCC index applied to a specific reference PRB (e.g., PRB with the lowest RB index) in the interlace.

As a further embodiment, when each independent OCC index is configured, each OCC may be mapped to PRBs corresponding to each interlace index according to OCC index cycling based on a value indicated by the BS (or a specific predefined value).

For PRBs included in an interlace with index N, if a value of k is indicated (or defined) for OCC index cycling, mapping may be performed in the following order: OCC index i, OCC index i+k, OCC index i+2k, . . . , starting from a PRB with the lowest (or highest) index.

For PRBs included in an interlace with index N+1, if a value of q is indicated (or defined) for OCC index cycling, mapping may be performed in the following order: OCC index j, OCC index j+q, OCC index j+2q, . . . , starting from a PRB with the lowest (or highest) index.

1-2-1-B. As another example, when interlace index N and interlace index N+1 are configured and/or allocated as a single PUCCH format (e.g., PUCCH format 2) resource for a single UE, a single OCC index, OCC index i may be commonly configured for interlace index and interlace index N+1.

As a specific embodiment, when the common OCC index is configured, the common OCC may be mapped to each PRB included in each interlace. That is, OCC index i may be mapped to both PRBs included in an interlace with index N and PRBs included in an interlace with index N+1.

As another embodiment, when OCC index cycling is applied to change the OCC index between PRBs included in one interlace (with a specific pattern), the configured OCC index may be se to an initial OCC index applied to a specific reference PRB (e.g., PRB with the lowest RB index) in the interlace.

As a further embodiment, even when the common OCC index is configured, if the BS independently indicates a value for OCC index cycling (or if an independent value is predefined for OCC index cycling), the OCC index may be mapped to PRBs corresponding to each interlace index based on the common OCC index and the OCC index cycling value indicated/defined for each interlace.

For PRBs included in an interlace with index N, if a value of k is indicated (or defined) for OCC index cycling, mapping may be performed in the following order: OCC index i, OCC index i+k, OCC index i+2k, . . . , starting from a PRB with the lowest (or highest) index.

For PRBs included in an interlace with index N+1, if a value of q is indicated (or defined) for OCC index cycling, mapping may be performed in the following order: OCC index j, OCC index j+q, OCC index j+2q, . . . , starting from a PRB with the lowest (or highest) index.

Proposed Method 1-2-2: One OCC index may be configured for a plurality of interlaces included in a single PUCCH resource, and the one OCC may be applied and/or mapped from a PRB with the lowest index (or from a PRB with the highest index) regardless of the interlace index.

1-2-2-A. As an example, when interlace index N and interlace index N+1 are configured and/or allocated as a single PUCCH format 2 resource for a single UE, OCC index i may be configured for interlace index N and interlace index N+1. In addition, the unit and/or periodicity of OCC cycling may be set to 10 PRBs. In this case, OCC index i may be mapped to half (e.g., 10 PRBs) of the entire PUCCH resource (i.e., PRBs included in interlace index N and interlace index N+1), and another OCC index (e.g., OCC index i+k), which is configured independently of OCC index i, may be mapped to the other half (e.g., 10 PRB).

1-2-2-B. As another example, when interlace index N and interlace index N+1 are configured and/or allocated as a single PUCCH format 2 resource for a single UE, OCC index i may be configured for interlace index N and interlace index N+1. In this case, the unit and/or periodicity of OCC cycling may be set to all PRBs included in the PUCCH resource. In addition, the entire PUCCH resource may be mapped to OCC index i.

1-2-2-B. As a further example, when interlace index N and interlace index N+1 are configured and/or allocated as a single PUCCH format 2 resource for a single UE, OCC index i may be configured for interlace index N and interlace index N+1. In this case, the unit and/or periodicity of OCC cycling may be set to a single PRBs. In addition, if a value of k for OCC index cycling is indicated (or defined) for PRBs included in an interlace with index N and an interlace with index N+1, mapping may be performed in the following order: OCC index i, OCC index i+k, OCC index i+2k, . . . , starting from a PRB with the lowest (or highest) index (regardless of the interlace index).

Proposed Method 1-2-3: An individual/independent OCC length (and an OCC index based on each OCC length) may be configured for each of a plurality of interlaces included in a single PUCCH resource, and the OCC length (and OCC index) may be applied/mapped to each interlace index.

According to Proposed Method 1-2-3, different OCC lengths may be provided for a plurality of UEs multiplexed to a plurality of interlace indices. For example, interlace index N and interlace index N+1 may be configured and/or allocated as a single PUCCH format 2 resource for a single UE. OCC length=A may be applied to interlace index N, and OCC length=B may be applied to interlace index N+1. In this case, the OCC may be mapped according to one of Proposed Methods 1-2-1 and 1-2-2.

Additionally, for a sequence for UCI and/or DMRS transmission in conventional PUCCH format 0/1/3/4, different cyclic shift (CS) values may be applied to OFDM symbols for inter-cell randomization (for example, hopping to different values). In ePUCCH format 2/3, a frequency-domain OCC may be used (within one OFDM symbol) for UE multiplexing. In this case, for the inter-cell randomization, the following methods may be considered to apply different OCC indices to OFDM symbols in which UCI (UCI REs or DMRS REs) is transmitted (for example, hopping to different indices).

Proposed Method 1-3-1: An OCC index applied to a specific OFDM symbol may be determined by a combination of a cell ID, a slot (index), and/or an OFDM symbol (index) in which UCI (UCI REs or DMRS REs) is transmitted on a PUCCH resource.

Specifically, when the UE receives an initial OCC index to be applied to the PUCCH resource from the BS, the UE may determine an OCC index offset based on a combination of a cell ID, a slot (index), and/or an OFDM symbol (index) in which UCI (UCI REs or DMRS REs) is transmitted by applying an OCC. The UE may obtain a finial OCC index by applying the determined OCC index offset to the initial OCC index (for example, by adding the OCC index offset to the initial OCC index), and then determine the final OCC index as the OCC index to be applied to the corresponding OFDM symbol.

It may be configured that different OCC indices are always applied to UCI symbols (UCI REs or DMRS REs) to be used by a plurality of UEs in the same cell, the same slot, and the same OFDM symbol.

For example, for the same slot and the same OFDM symbol, it may be assumed that four UEs are multiplexed in cell A (i.e., OCC index 0 to OCC index 3 are available) and four UEs are multiplexed in cell B as well. (i.e., OCC index 0 to OCC index 3 are available).

In this case, for cell A, if the UE is configured with initial OCC index 0, the UE may actually use an OCC index (e.g., 2) different from initial OCC index 0 in a specific OFDM symbol. The different OCC index may be configured by a combination of a cell ID, a slot, and/or an OFDM symbol in which UCI symbols (or UCI REs or DMRS REs) are transmitted. For cell B, if the UE is configured with initial OCC index 0, the UE may actually use an OCC index (e.g., 3) different from initial OCC index 0 in the same OFDM symbol. The different OCC index may be configured by a combination of a cell ID, a slot, and/or an OFDM symbol in which in which UCI symbols (or UCI REs or DMRS REs) are transmitted.

Proposed Method 1-3-2: An OCC index applied to a specific PRB or a specific interlace may be determined by a combination of a cell ID, an interlace (index), a PRB (index), a slot (index), and/or an OFDM symbol (index) in which UCI (UCI REs or DMRS REs) is transmitted on a PUCCH resource.

Specifically, when the UE receives an initial OCC index to be applied to the PUCCH resource from the BS, the UE may determine an OCC index offset based on a combination of a cell ID, an interlace (index), a PRB (index), a slot (index), and/or an OFDM symbol (index) in which UCI (UCI REs or DMRS REs) is transmitted by applying an OCC. The UE may obtain a finial OCC index by applying the determined OCC index offset to the initial OCC index (for example, by adding the OCC index offset to the initial OCC index), and then determine the final OCC index as the OCC index to be applied to the corresponding PRB or interlace Different OCC indices may be always applied to UCI symbols (UCI REs or DMRS REs) to be used by a plurality of UEs in the same cell, the same slot, and the same OFDM symbol.

To maintain orthogonality between cyclic shifted OCCs, CS as many as the same (frequency-domain) samples may be applied to UCI symbols (UCI REs or DMRS REs) to be used by a plurality of UEs in the same cell, the same slot, and the same OFDM symbol.

For example, for the same slot and the same OFDM symbol, it may be assumed that four UEs are multiplexed in cell A (i.e., OCC index 0 to OCC index 3 are available) and four UEs are multiplexed in cell B as well. (i.e., OCC index 0 to OCC index 3 are available).

In this case, for cell A, if the UE is configured with initial OCC index 0, a CS value actually calculated by the UE may be two samples. The CS value may be calculated based on a combination of a cell ID, a slot, and/or an OFDM symbol in which UCI symbols (or UCI REs or DMRS REs) are transmitted. For cell B, if the UE is configured with initial OCC index 0, a CS value actually calculated by the UE may be three samples. The CS value may be calculated based on a combination of a cell ID, a slot, and/or an OFDM symbol in which UCI symbols (or UCI REs or DMRS REs) are transmitted. Since OCCs having different CS values are used between cells, the effect of the inter-cell randomization may increase.

2.2. Embodiment 2: Actually-Used PRBs in Enhanced PUCCH Format 2/3 Enhancement in NR-U In NR, the BS may allocate an UL resource for transmission of PUCCH format 2/3 at the UE, and the UE may calculate actually-used PRBs based on the actual UCI size and coding rate. If the number of actually-used PRBs is less than the number of PRBs corresponding to the UL resource indicated by the BS, the UE may use the actually-used PRBs only to perform the PUCCH transmission. That is, the UE may not use the remaining PRBs. The BS may also know the above-described UE operation in advance, and the remaining PRBs may be used for other UL resources. Alternatively, the remaining PRBs may be dropped.

The operation of using only some of the allocated PRBs may be applied to ePUCCH format 2/3 in the shared spectrum. Particularly, a specific interlace index may consist of 11 PRBs (depending on SCSs), and the OCB requirements may be satisfied by only 10 PRBs. Therefore, when the UE is allocated an interlace index composed of 11 PRBs from the BS for transmission of ePUCCH format 2/3, if actually-used PRBs calculated by the UE based on the actual UCI size and coding rate are 10 PRBs, the UE may drop one PRB and transmit the PUCCH in only 10 PRBs. The BS may also know the UE operation in advance, and the corresponding one PRB may be used for other UL resources. In particular, the dropped one PRB may be combined with PRBs in an inter-carrier guard band existing between LBT subbands and used as a resource for PUSCH transmission in the conventional system.

This operation may also be applied when multiple interlace indices are indicated. When the BS allocates M interlace indices, each of which is composed of 11 PRBs, as a PUCCH resource, if the actually-used PRBs calculated by the UE based on the actual UCI size and coding rate are less than 11*M PRBs, the UE may drop one PRB with the highest (or lowest) index in the highest (or lowest) interlace index. If the number of PRBs to be dropped is 2 or higher, one PRB with the highest (or lowest) index may be dropped in the following order: the second highest (or lowest) interlace index and the third highest (or lowest) interlace index.

Additionally, when the BS indicates a plurality of interlace indices, the following methods may be applied to individual cases because each interlace index may be composed of 10 or 11 PRBs.

2-1-1. When interlaces corresponding to a plurality of interlace indices indicated by the BS include the same number of PRBs, if the UE is allowed to drop one or more interlaces based on the number of actually-used PRBs calculated by the UE, the UE may drop the highest (or lowest) interlace index. In other words, if the number of actually-used PRBs calculated by the UE is less than or equal to the number of PRBs in one interlace, the UE may drop the highest (or lowest) interlace index. For example, when each of the plurality of interlaces consists of only 10 PRBs, if the number of actually-used PRBs calculated by the UE is less than the total number of indicated PRBs by 10 or more, that is, if the number of actually-used PRBs is less than or equal to 10, the UE may transmit the PUCCH in the remaining interlaces except for the interlace with the highest index. When each of the plurality of interlaces consists of only 11 PRBs, if the number of actually-used PRBs calculated by the UE is less than the total number of indicated PRBs, that is, if the number of actually-used PRBs is less than or equal to 11, the UE may transmit the PUCCH in the remaining interlaces except for the interlace with the highest index.

For example, when the BS indicates two interlaces, if the number of actually-used PRBs calculated by the UE is less than or equal to the number of PRBs included in one interlace, the UE may drop one interlace with a relatively high index. The UE may transmit the PUCCH in the other interlace with a relatively low index. Whether the number of actually-used PRBs is less than or equal to the number of PRBs in one interlace may be determined based on the UCI size and coding rate that the UE needs to actually transmit as described above. For the UCI size, the number of HARQ-ACK bits to be transmitted and the number of CRC bits to be added may be considered.

2-1-2. When a plurality of interlace indices indicated by the BS include interlaces composed of different numbers of PRBs (i.e., when there are interlaces composed of 10 PRBs and interlaces composed of 11 PRBs), if the UE is allowed to drop one or more interlaces based on the number of actually-used PRBs calculated by the UE (i.e., when the number of actually-used PRBs is less than the total number of PRBs in the indicated multiple interlaces by 10 or 11 or more), the UE may transmit the PUCCH by selecting interlace indices based on the number of actually-required PRBs.

For example, when the BS indicates two interlaces (one interlace composed of 10 PRBs and one interlace composed of 11 PRBs), If the number of actually-used PRBs calculated by the UE is less than or equal to 11 (or equal to 11), the UE may transmit the PUCCH by selecting the interlace composed of 11 PRBs and drop the interlace composed of 10 PRBs. If the number of actually-used PRBs is more than 11, the UE may use the two interlaces to transmit the PUCCH.

If the number of actually-used PRBs calculated by the UE is less than or equal to 10 (or equal to 10), the UE may transmit the PUCCH by selecting the interlace composed of 10 PRBs and drop the interlace composed of 11 PRBs. If the number of actually-used PRBs is 11, the UE may transmit the PUCCH by selecting the interlace composed of 11 PRBs and drop the interlace composed of 10 PRBs. If the number of actually-used PRBs is more than 11, the UE may use the two interlaces to transmit the PUCCH.

Additionally, according to intra-carrier guard band configurations, the total number of PRBs included in a specific LBT subband may be less than 50 at 30 kHz (or less than 100 at 15 kHz). In this case, the number of PRBs included in an interlace may be 10 or 9 depending on the interlace index. Accordingly, when a plurality of interlace indices (e.g., two interlace indices) are indicated and/or configured for a single PUCCH resource, each interlace index may consist of 10 or 9 (or 11) PRBs, and the following operation may be defined in consideration of the OCB requirements.

2-2-1. At least one interlace index included in each PUCCH resource may be allocated to satisfy the OCB requirements.

For example, considering that an interlace composed of 10 (or 11) PRBs satisfies the OCB requirements and an interlace composed of 9 PRBs does not satisfy the OCB requirements, the BS may configure at least one interlace index such that an interlace with the corresponding interlace index is composed of 10 (or 11) PRBs when configuring one PUCCH resource with a plurality of interlaces.

2-2-2. A plurality of interlace indices included in each PUCCH resource may be allocated to satisfy the OCB requirements.

For example, the BS may allocate a PUCCH resource by using two interlace indices each composed of 9 PRBs in order to satisfy the OCB requirements.

2-2-3. When multiple interlace indices indicated by the BS consist of the same number of PRBs (i.e., either 10 PRBs only or 9 (or 11) PRBs only), if the UE is allowed to drop one or more interlaces based on the number of actually-used PRBs calculated by the UE (i.e., if the number of actually-used PRBs is less than the total number of PRBs in the indicated multiple interlaces by the number of PRBs per interlace or more), the UE may drop an interlace with the highest (or lowest) index.

For example, when the BS indicates two interlaces (e.g., either two interlaces each composed of 10 PRBs, two interlaces each composed of 9 PRBs, or two interlaces composed of 11 PRBs), if the number of actually-used PRBs calculated by the UE is less than or equal to 10 (9 or 11), the UE may drop one interlace with the highest (or lowest) index. The UE may use only the remaining one interlace index to transmit the PUCCH.

In this case, the operation in which each interlace consists of only 9 PRBs and/or one of the two interlaces needs to be dropped may be applied to general cases, but in particular, the operation may be applied to a case where an OCB of 2 MHz needs to be temporally satisfied (e.g., CO sharing, etc.).

2-2-4. When multiple interlace indices indicated by the BS include interlaces composed of different numbers of PRBs (i.e., when a specific interlace consists of 10 PRBs and another interlace consists of 9 (or 11) PRBs), if the UE is allowed to drop one or more interlace indices based on the number of actually-used PRBs calculated by the UE (i.e., if the number of actually-used PRBs is less than the total number of PRBs of the indicated multiple interlaces by 10 or 9 (or 11) or more), the UE may transmit the PUCCH by selecting interlace indices based on the number of actually-required PRBs. Alternatively, the UE may be configured to preferentially drop an interlace index composed of a smaller number of PRBs and preferentially use an interlace index composed of a larger number of PRBs for the transmission.

2-2-4A. As an example, when the BS indicates two interlaces (one interlace composed of 10 PRBs and the other interlace composed of 9 PRBs), If the number of actually-used PRBs calculated by the UE is less than or equal to 10 (even less than or equal to 9), the UE may transmit the PUCCH by preferentially selecting an interlace index that satisfies the OCB requirements (i.e., the interlace composed of 10 PRBs) and drop the interlace composed of 9 PRBs. If the number of actually-used PRBs is more than 10, the UE may use the two interlaces to transmit the PUCCH.

If the number of actually-used PRBs calculated by the UE is less than or equal to 9 and/or when an OCB of 2 MHz OCB needs to be satisfied temporally (e.g., CO sharing, etc.), the UE may transmit the PUCCH by selecting the interlace composed of 9 PRBs and drop the interlace composed of 10 PRBs. If the number of actually-used PRBs is 10, the UE may transmit the PUCCH by selecting the interlace composed of 10 PRBs and drop the interlace composed of 9 PRBs. If the number of actually-used PRBs is more than 10, the UE may use the two interlaces to transmit the PUCCH.

2-2-4B. As another example, when the BS indicates two interlaces (one interlace composed of 10 PRBs and the other interlace composed of 11 PRBs), If the number of actually-used PRBs calculated by the UE is less than or equal to 11 (even less than or equal to 10), the UE may transmit the PUCCH by preferentially selecting the interlace composed of more 11 PRBs and drop the interlace composed of 10 PRBs. If the number of actually-used PRBs is more than 11, the UE may use the two interlaces to transmit the PUCCH.

In the proposed methods, if an unused interlace index is selected, it may be interpreted to mean that among indices indicated by the RRC configuration, the last index (i.e., highest index) or the first index (i.e., lowest index) is selected. Specifically, if two interlaces are configured by the RRC configuration, an interlace set interlace 0 in the RRC configuration may have the lowest interlace index and an interlace set to interlace 1 in the RRC configuration may have the highest interlace index.

PRB Adaptation Mechanism of Enhanced PUCCH Format 3 Based on UE Multiplexing

For ePUCCH format 3, a DFT may be performed before resource mapping after UCI is included based on the total number of available PRBs. If a single UE uses the entirety of a configured PUCCH resource without UE multiplexing, the actually-used PRB configuration method described above may be applied. However, when two or more UEs are multiplexed based on ePUCCH format 3, there may be a problem in that a DFT is performed except for a specific PRB because the DFT needs to be performed before resource mapping. Therefore, when UE multiplexing is allowed, an RB adaptation method may not be used for ePUCCH format 3. In other words, a parameter related to allowance of RB adaptation may be explicitly included in higher layer signaling (e.g., SIB, RMSI, etc.). Depending on UE multiplexing related parameters (e.g., the number of speeding factors, the number of UEs for multiplexing (# of UE for multiplexing), etc.), it may be implicitly determined that the UE is allowed to perform the RB adaptation.

Specifically, for PUCCH format 3, CDM based UE multiplexing (e.g., based on application of the OCC) may be supported before the DFT. Alternatively, only a single UE may be supported without the CDM based UE multiplexing. When a plurality of interlaces are configured and/or allocated as a single PUCCH format 3 resource for a single UE, if the DFT is performed across the plurality of interlaces, whether the UE is allowed to perform the RB adaptation according to the actual UCI payload and maximum UCI coding rate of the UE may be determined depending on whether CDM (based on application of the OCC) is applied before the DFT. As described above, the RB adaptation may refer to an operation of using only the minimum number of RBs capable of transmitting the corresponding actual UCI payload while satisfying the maximum UCI coding rate within a configured RB set. For example, for the PUCCH format 3 resource based on multiple interlaces, if the CDM based UE multiplexing is not supported before the DFT, the RB adaptation may be performed. If the CDM based UE multiplexing is applied before the DFT, the RB adaptation may not be performed. That is, the configured RB set may be completely used to transmit UCI, regardless of the actual UCI payload size.

As another method, when a plurality of interlaces are configured and/or allocated as a single PUCCH format 3 resource for a single UE, the DFT may be performed independently for each interlace. In this case, the application of OCC based CDM, OCC indices, OCC lengths, etc. may be configured separately/independently for each interlace (or be configured in common for the plurality of interlaces). Additionally, the RB adaptation may be performed for each interlace, regardless of whether the OCC based CDM is applied. As described above, the RB adaptation may refer to an operation of using only the minimum number of RBs capable of transmitting the corresponding actual UCI payload while satisfying the maximum UCI coding rate within a configured RB set.

2.3. Embodiment 3: Paring Between OCC Index Used for UCI RE and OCC Index Used for DMRS RE in Enhanced PUCCH Format 2

For conventional NR PUCCH format 4, OCC indices used for UCI symbols and cyclic shift indices used for DMRS symbols are defined as shown in Table 10. If two UEs are multiplexed at once, {OCC index 0 and cyclic shift 0} and {OCC index 1 and cyclic shift 6} are paired. If four UEs are multiplexed at once, {OCC index 0 and cyclic shift 0}, {OCC index 1 and cyclic shift 6}, {OCC index 2 and cyclic shift 3}, and {OCC index 3 and cyclic shift 9} are paired.

TABLE 10

| Orthogonal sequence index n | Cyclic shift index $m_0$ | |
| --- | --- | --- |
| | $N_{SF}^{PUCCH,4} = 2$ | $N_{SF}^{PUCCH,4} = 4$ |
| 0 | 0 | 0 |
| 1 | 6 | 6 |
| 2 | — | 3 |
| 3 | — | 9 |

On the other hand, for ePUCCH format 2, a maximum of four UE may be multiplexed (that is, one, two, or four UEs may share the same resource). In this case, for ePUCCH format 2, since OCCs are used for both UCI REs and DMRS REs for multiplexing, pairing between the OCCs needs to be defined.

For example, OCCs for UCI REs may be defined as shown in Tables 11 and 12 according to the number of multiplexed UEs. Table 11 shows OCCs when two UEs are multiplexed, and Table 12 shows OCCs when four UEs are multiplexed.

TABLE 11

| n | $w_n(i)$ |
|---|---|
| 0 | [+1 +1] |
| 1 | [+1 −1] |

TABLE 12

| n | $w_n(i)$ |
|---|---|
| 0 | [+1 +1 +1 +1] |
| 1 | [+1 −1 +1 −1] |
| 2 | [+1 +1 −1 −1] |
| 3 | [+1 −1 −1 +1] |

In Tables 11 and 12, $w_n(i)$ denotes the index of an OCC to be mapped to a UCI RE. As a first method, REs with the same OCC index may be paired as shown in Table 13. In this case, $w_n(i)$ denotes the index of an OCC to be mapped to a DMRS RE.

TABLE 13

| Orthogonal sequence index n (for UCI RE) | Orthogonal sequence index m (for DMRS RE) | |
|---|---|---|
| | $N_{SF}^{PUCCH,A} = 2$ | $N_{SF}^{PUCCH,A} = 4$ |
| 0 | 0 | 0 |
| 1 | 1 | 1 |
| 2 | — | 2 |
| 3 | — | 3 |

As another method, different OCC indices may be paired between the UCI and DMRS as shown in Table 14 or Table 15.

TABLE 14

| Orthogonal sequence index n (for UCI RE) | Orthogonal sequence index m (for DMRS RE) | |
|---|---|---|
| | $N_{SF}^{PUCCH,A} = 2$ | $N_{SF}^{PUCCH,A} = 4$ |
| 0 | 1 | 1 |
| 1 | 0 | 0 |
| 2 | — | 3 |
| 3 | — | 2 |

TABLE 15

| Orthogonal sequence index n (for UCI RE) | Orthogonal sequence index m (for DMRS RE) | |
|---|---|---|
| | $N_{SF}^{PUCCH,A} = 2$ | $N_{SF}^{PUCCH,A} = 4$ |
| 0 | 1 | 3 |
| 1 | 0 | 2 |
| 2 | — | 1 |
| 3 | — | 0 |

Implementation Examples

FIG. 10 is a flowchart illustrating a signal transmission/reception method according to embodiments of the present disclosure.

Referring to FIG. 10, the embodiments of the present disclosure may be performed by a UE. The embodiments of the present disclosure may include: receiving information on a PUCCH resource (S1001); transmitting a PUCCH including the UCI based on the information on the PUCCH resource (S1003).

A format for transmitting the PUCCH may be determined based on one or more of the methods proposed in Embodiments 1 to 3.

For example, the UE may determine an interlace for transmitting the PUCCH based on Embodiment 2.

For example, if the PUCCH format is configured according to 2-1-1 of Embodiment 2, an interlace used by the UE to transmit the PUCCH may be determined as the first interlace among the first and second interlaces based on (i) the index of the first interlace set lower than the index of the second interlace by the configuration for the first and second interlaces and (ii) the number of PRBs for transmitting the UCI less than or equal to the number of PRBs of the first interlace.

Whether the number of PRBs for transmitting the UCI is less than or equal to the number of PRBs of the first interlace may be determined based on the size of the UCI and a coding rate.

The index of the first interlace and the index of the second interlace may be determined based on RRC signaling including the configuration for the first and second interlaces.

The first and second interlaces may include the same number of PRBs.

The PUCCH may be transmitted based on a specific PUCCH format. The specific PUCCH format may include PUCCH format 2 and PUCCH format 3.

In addition to the operations of FIG. 10, at least one of the operations described with reference to FIGS. 1 to 9 and/or at least one of the operations described in Embodiments 1 to 3 may be combined and performed. For example, the UE may perform UL LBT before transmitting the PUCCH.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 11 illustrates a communication system 1 applied to the present disclosure.

Referring to FIG. 11, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 12 illustrates wireless devices applicable to the present disclosure.

Referring to FIG. 12, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 13 illustrates another example of a wireless device applied to the present disclosure. The wireless device may be implemented in various forms according to a use case/service (refer to FIG. 11).

Referring to FIG. 13, wireless devices 100 and 200 may correspond to the wireless devices 100 and 200 of FIG. 12 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcasting terminal, a hologram device, a public safety device, an MTC device, a medical device, a FinTech device (or a finance device), a security device, a climate/environment device, the AI server/device (400 of FIG. 11), the BSs (200 of FIG. 11), a network node, or the like. The wireless device may be mobile or fixed according to a use case/service.

In FIG. 13, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 14 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of transmitting an uplink signal by a user equipment (UE) operating in a wireless communication system, the method comprising:
   receiving information on a physical uplink control channel (PUCCH) resource included in radio resource control (RRC) signaling; and
   transmitting a PUCCH including uplink control information (UCI) based on the information on the PUCCH resource,
   wherein the UCI comprises HARQ-ACK information,
   wherein a first interlace and a second interlace are configured by the information on the PUCCH resource included in the RRC signaling,
   wherein based on a first value, determined based on a payload size of the UCI, being less than or equal to a second value, determined based on a number of physical resource blocks (PRBs) of the first interlace, the PUCCH is transmitted over the first interlace among the first and second interlaces,
   wherein the number of PRBs of the first interlace is 10 or 11,
   wherein the PUCCH is transmitted based on a PUCCH format 2 or a PUCCH format 3,
   wherein an index of the second interlace and an index of the first interlace are defined based on the information on the PUCCH resource included in the RRC signaling, and
   wherein the index of the second interlace is higher than the index of the first interlace.

2. The method of claim 1, wherein whether the first value is less than or equal to the second value is determined based on the payload size of the UCI and a coding rate.

3. The method of claim 1, wherein the first and second interlaces include a same number of PRBs based on the PUCCH being transmitted based on the PUCCH format 3.

4. A user equipment (UE) configured to transmit an uplink signal in a wireless communication system, the UE comprising:
   at least one transceiver;
   at least one processor; and
   at least one memory operably connected to the at least one processor and configured to store instructions that, when executed, cause the at least one processor to perform operations comprising:
   receiving information on a physical uplink control channel (PUCCH) resource included in radio resource control (RRC) signaling; and
   transmitting a PUCCH including uplink control information (UCI) based on the information on the PUCCH resource,
   wherein the UCI comprises HARQ-ACK information,
   wherein a first interlace and a second interlace are configured by the information on the PUCCH resource included in the RRC signaling,
   wherein based on a first value, determined based on a payload size of the UCI, being less than or equal to a second value, determined based on a number of physical resource blocks (PRBs) of the first interlace, the PUCCH is transmitted over the first interlace among the first and second interlaces,
   wherein the number of PRBs of the first interlace is 10 or 11,
   wherein the PUCCH is transmitted based on a PUCCH format 2 or a PUCCH format 3,
   wherein an index of the second interlace and an index of the first interlace are defined based on the information on the PUCCH resource included in the RRC signaling, and
   wherein the index of the second interlace is higher than the index of the first interlace.

5. The UE of claim 4, wherein whether the first value is less than or equal to the second value is determined based on the payload size of the UCI and a coding rate.

6. The UE of claim 4, wherein the first and second interlaces include a same number of PRBs based on the PUCCH being transmitted based on the PUCCH format 3.

7. An apparatus for a user equipment (UE), the apparatus comprising:
   at least one processor; and
   at least one computer memory operably connected to the at least one processor and configured to, when executed, cause the at least one processor to perform operations comprising:
   receiving information on a physical uplink control channel (PUCCH) resource included in radio resource control (RRC) signaling; and
   transmitting a PUCCH including uplink control information (UCI) based on the information on the PUCCH resource,
   wherein the UCI comprises HARQ-ACK information,
   wherein a first interlace and a second interlace are configured by the information on the PUCCH resource included in the RRC signaling,
   wherein based on a first value, determined based on a payload size of the UCI, being less than or equal to a second value, determined based on a number of physical resource blocks (PRBs) of the first interlace, the PUCCH is transmitted in-over the first interlace among the first and second interlaces,
   wherein the number of PRBs of the first interlace is 10 or 11,
   wherein the PUCCH is transmitted based on a PUCCH format 2 or a PUCCH format 3,
   wherein an index of the second interlace and an index of the first interlace are defined based on the information on the PUCCH resource included in the RRC signaling, and
   wherein the index of the second interlace is higher than the index of the first interlace.

8. The apparatus of claim 7, wherein whether the first value is less than or equal to the second value is determined based on the payload size of the UCI and a coding rate.

9. The apparatus of claim 7, wherein the first and second interlaces include a same number of PRBs based on the PUCCH being transmitted based on the PUCCH format 3.

* * * * *